United States Patent
Ajmera et al.

(10) Patent No.: US 9,477,324 B2
(45) Date of Patent: Oct. 25, 2016

(54) GESTURE PROCESSING

(75) Inventors: Rahul Ajmera, Bangalore (IN); Anbumani Subramanian, Bangalore (IN); Sriganesh Madhvanath, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1836 days.

(21) Appl. No.: 12/779,061

(22) Filed: May 13, 2010

(65) Prior Publication Data

US 2011/0234492 A1    Sep. 29, 2011

(30) Foreign Application Priority Data

Mar. 29, 2010 (IN) .............................. 846/CHE/2010

(51) Int. Cl.
| | |
|---|---|
| *G06F 3/03* | (2006.01) |
| *G06F 3/042* | (2006.01) |
| *G01S 15/42* | (2006.01) |
| *G01S 15/50* | (2006.01) |
| *G06F 3/01* | (2006.01) |
| *G06F 3/0488* | (2013.01) |

(52) U.S. Cl.
CPC ............. *G06F 3/0304* (2013.01); *G06F 3/017* (2013.01); *G06F 3/0488* (2013.01)

(58) Field of Classification Search
USPC .......... 324/658, 678; 331/111; 345/156, 158, 345/207, 420; 348/47; 382/103; 701/532; 704/233; 715/810, 883, 702, 863; 725/39; 340/521
See application file for complete search history.

(56) References Cited

U.S. PATENT DOCUMENTS

| | | | | |
|---|---|---|---|---|
| 2007/0121097 | A1* | 5/2007 | Boillot | ............................ 356/28 |
| 2009/0292989 | A1* | 11/2009 | Matthews et al. | ............ 715/702 |
| 2010/0199221 | A1* | 8/2010 | Yeung et al. | ................ 715/850 |
| 2011/0041100 | A1* | 2/2011 | Boillot | ........................ 715/863 |

* cited by examiner

*Primary Examiner* — Lin Li
(74) *Attorney, Agent, or Firm* — Elkington and Fife LLP

(57) ABSTRACT

Presented is method and system for processing a gesture performed by a user of an input device. The method comprises detecting the gesture and determining a distance of the input device from a predetermined location. A user command is then determined based on the detected gesture and the determined distance.

20 Claims, 6 Drawing Sheets

GESTURE PROCESSING

RELATED APPLICATIONS

Benefit is claimed under 35 U.S.C. 119(a)-(d) to Foreign application Serial No. 846/CHE/2010 entitled "GESTURE PROCESSING" by Hewlett-Packard Development Company, L.P., filed on Mar. 29, 2010, which is herein incorporated in its entirety by reference for all purposes

BACKGROUND

Computing systems accept a variety of inputs. Some computer applications accept gestures provided by input devices to enable easier control and navigation of the applications.

Gestures are ways to invoke an action, similar to clicking a toolbar button or typing a keyboard shortcut. Gestures may be performed with a pointing device (including but not limited to a mouse, stylus, hand and/or finger). A gesture typically has a shape, pose or movement associated with it. Such a gesture may be as simple as a stationary pose or a straight line movement or as complicated as a series of movements or poses.

BRIEF DESCRIPTION OF THE DRAWINGS

For a better understanding, embodiments will now be described, purely by way of example, with reference to the accompanying drawings, in which.

DETAILED DESCRIPTION

Embodiments provide a method of processing a gesture performed by a user of a first input device, the method comprising: detecting the gesture; detecting a distance of the first input device from a predetermined location, the detected distance being for disambiguating the gesture; and determining a user command based on the detected gesture and the detected distance. Accordingly, there is provided a natural and intuitive interface method by which to command an action using a gesture.

Embodiments comprise an architecture and related computational infrastructure such that the distance of a input device from a predetermined location (such as a display device or the user's upper torso) may be used so as to specify a gesture in more detail (in other words, disambiguate or qualify the gesture). Once determined, a gesture may be detected and combined with the distance to determine a command or action desired by the user. Thus, embodiments may employ hardware and software such that the distance of the input device from a predetermined location may be controlled by the user, as well as hardware and software such that a gesture can be input and detected. A variety of architectures may be used to enable such functions.

The distance may specify, for example, a desired command or a parameter for a command, such as the extent of a zoom-in command.

A natural and intuitive means of interaction is provided, enabling a user of such a system to feel as though he or she is physically interacting with the system, for example, by accurately moving an input device towards a display to select a data file. Thus, a unique and compelling gesture interface is hereby disclosed as a means of interacting with a graphical user interface (GUI).

Commands may be associated with the gesture. These operations may include navigation forward, backward, scrolling up or down, changing applications, and arbitrary application commands. Further, a gesture does not need to have a predefined meaning but rather may be customizable by a developer or user to perform an action or combination of actions so that a user may have quick access to keyboard shortcuts or macros, for example.

Different input devices may modify actions associated with gestures. For instance, a first set of actions may be associated with gestures when performed by a stylus. A second set of actions may be associated with gestures when performed by another pointing device. The number of sets of actions may be varied by the number of different input devices.

Figure 1:
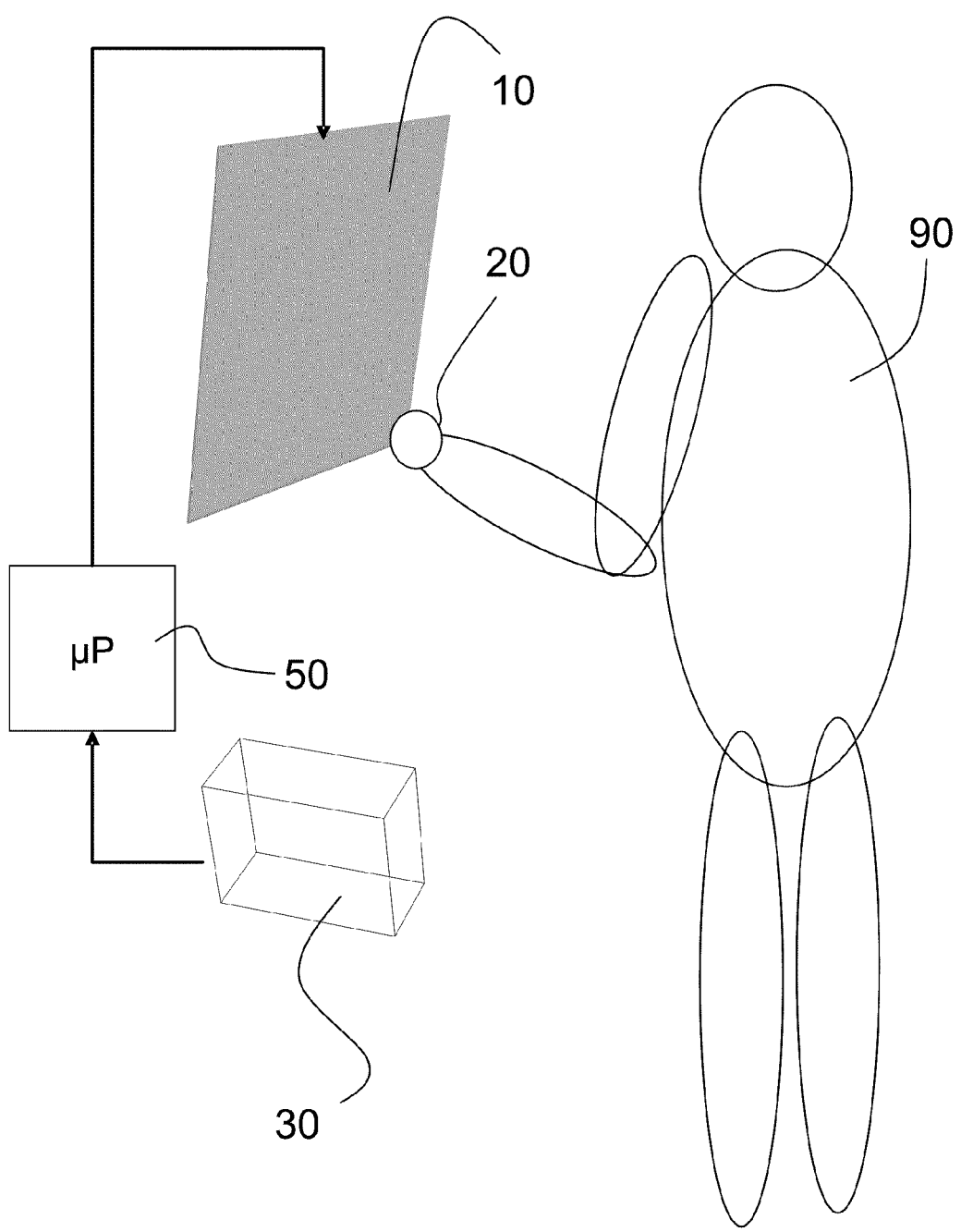
FIG. 1 is a schematic diagram of the arrangement of apparatus according to an embodiment.

An embodiment, pictured in FIG. 1, provides apparatus for processing a gesture performed by a user 90 of an input device. The apparatus comprises a display surface 10; an input device 20, for performing a gesture; a range camera 30 for producing a depth-image; and a processor 50. The field of view of the range camera 30 includes the input device 20. The processor 50 is adapted to detect, from the depth-image (or otherwise), a gesture performed by a user of the input device 20. It is also adapted to determine the distance of the input device 20 from a predetermined location, such as the display surface 10 for example.

The processor then uses the determined distance to specify a detected gesture in more detail (in other words, disambiguate or qualify the gesture).

In the embodiment of FIG. 1, the input device 20 comprises part of the body of a user 90. In particular, the input device comprises the user's hand.

Using the input device 20, the user 90 can select, highlight, and/or modify items displayed on the display surface 10. The processor 50 interprets gestures made using the input device 20 in order to manipulate data, objects and/or execute conventional computer application tasks.

Other types of input devices, such as a mouse, stylus, trackball, or the like could be used. Additionally, a user's own hand or finger could be the input device 20 and used for selecting or indicating portions of a displayed image on a proximity-sensitive display. Consequently, the term "user input device", as used herein, is intended to have a broad definition and encompasses many variations on well-known input devices.

The range camera 30 is sometimes also known as a depth camera. This is an imaging system which provides a two-dimensional array of depth values—that is, a depth image. Optionally, it may also produce a normal (grayscale or color) image in addition to the depth image. In the present example, the range camera is based on the time-of-flight principle: pulses of infra-red light are emitted to all objects in the field of view and the time of arrival of the reflected pulses is measured, to determine the distance from the sensor.

Note that range cameras of other types may also be used. The skilled person will be familiar with a variety of other potentially suitable distance-sensing technologies. These include stereo imaging, or stereo triangulation, in which two (or more) image sensors are used to determine a depth image by making disparity measurements. Another possibility is to illuminate a scene with so-called "structured light", where a geometric pattern such as a checkerboard is projected, and depth/distance information is determined from the distortions observed when this known pattern falls on the objects in the scene.

In the arrangement of FIG. 1, the depth camera 30 is positioned to observe the display surface 10, from a relatively short distance of about 0.5 m to 1 m. The camera 30 is spatially positioned such that the display surface 10 is visible in the field-of-view of the camera. An interaction volume is defined as the region in front of the display where the user's hand is visible in the field of view during interaction.

A simple, one-time calibration procedure can be used to locate the four corners of the display surface. This may be either manual, whereby the user indicates the positions of the vertices, or could be automatic, by analysis of the image of the scene. To help with automatic or semi-automatic detection of the surface, its boundaries may be identified with markers of distinctive color or brightness. If calibration is manual, then the camera should be manually recalibrated if it is disturbed.

The range camera observes only one side of the hand; so the depth measurements of the side visible to the camera are inevitably biased slightly compared with the true central position of the hand 20. However, this slight bias can either be ignored or easily compensated for.

The distance from the hand to the display surface 10, for example, can be computed analytically to obtain an interaction distance. Thus, the distance from the display surface is determined. The distance from the user's hand to the display can be used as a measure to control of mode of interaction. By determining a distance from the input device 20 to the display surface 10, the processor 50 can control the user interaction differently according to this distance.

Figure 2:
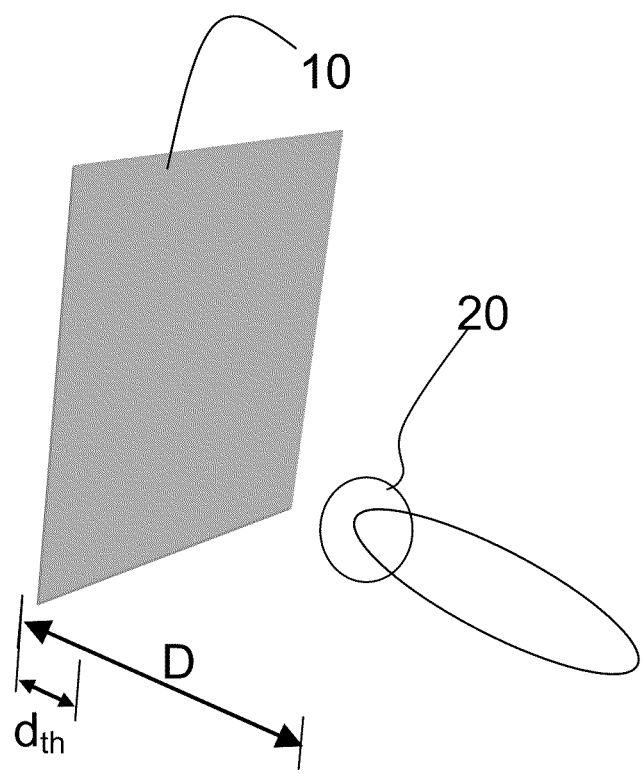
FIG. 2 shows detail of FIG. 1.

An example of this is illustrated in FIG. 2. If the distance D from the display is less than a small threshold distance, $d_{th}$, a touch-like interaction happens. If the distance is greater than this threshold, a hover-like interaction occurs. A hover interaction may involve, for example, moving a pointer (similar to moving a conventional mouse). A touch interaction might involve, for example, a selection (like clicking a mouse button). One of the effects of this is to provide any display surface with the qualities of a touch-sensitive screen. That is, a surface that is not touch sensitive can be made to emulate a touch-sensitive surface. In the example of FIG. 2, the distance is measured perpendicular to the planar display surface. However, in other applications, it could be measured along a pointing axis (which may have a different orientation).

It will be understood that the location of the input device 20 may be made relative to other predetermined locations instead of the display surface 10. For example, the distance of a user's body may be determined from the depth image, thus enabling the distance of the input device 20 from the user's body to be determined and used to specify a detected gesture in more detail (in other words, disambiguate or qualify the gesture).

It will also be understood that alternative camera arrangements may be used such as a conventional arrangement of the camera in the same plane as the display and observing the user so that the display is not in the field of view of the camera.

The processor 50 can comprise hardware of various types. In this example, the processor is a central processing unit (CPU) of a personal computer (PC). Accordingly, the display surface 10 is the display of the PC, which is under the control of the CPU 50. The apparatus allows the user 90 to provide input to the PC by making hand gestures. The processor 50 acts on this user input by controlling an operation depending on the gesture(s) made and the location of the gesture relative to the display surface 10. The operation could be of almost any type: for example, the activation of a software application or the pressing of a button or selection of a menu item within an application. Of course, as will be readily apparent to those skilled in the art, the processor may be comprised in another hardware device, such as a set-top box (STB). The range of suitable operations which may be controlled will vary accordingly. With a STB, for example, the operation controlled may involve changing channels or browsing an electronic program guide (EPG).

Figure 3:
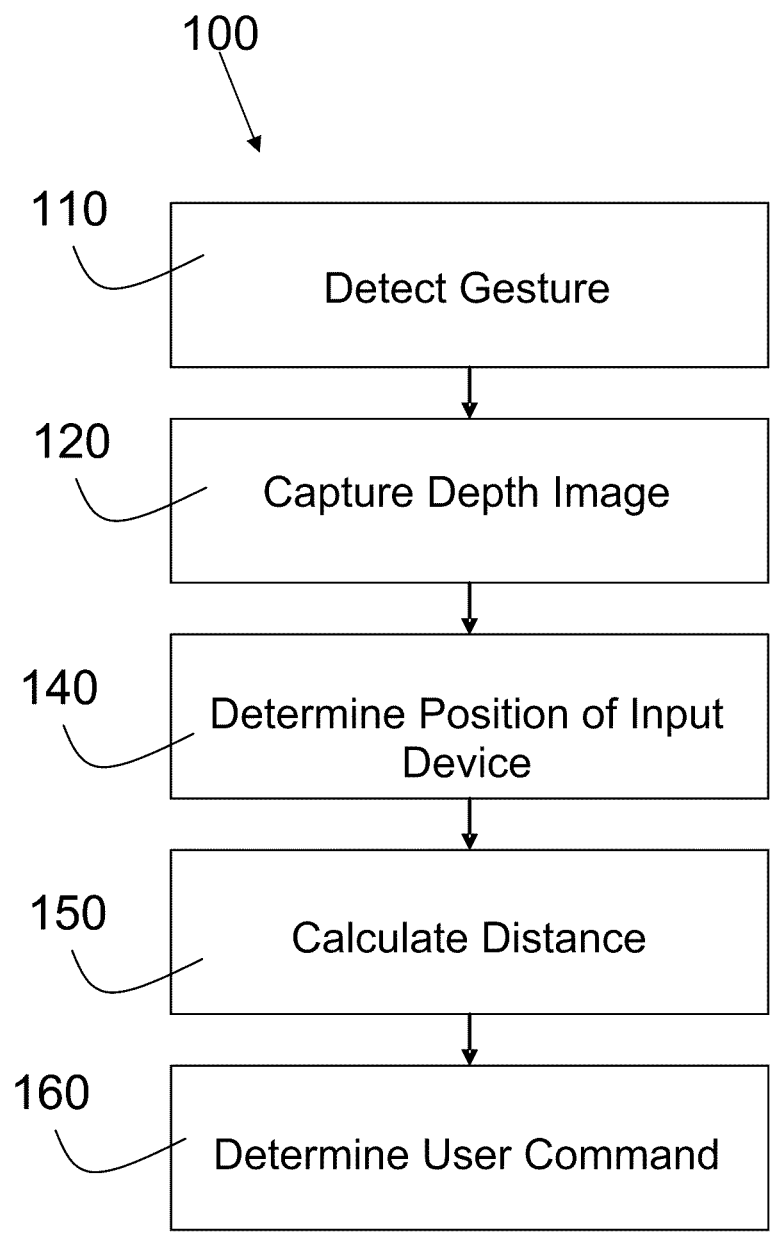
FIG. 3 is a flowchart of a method according to an embodiment

In embodiments, the processor executes a method 100 of processing a gesture performed by a user of an input device, as illustrated in FIG. 3. The method 100 comprises: detecting 110 the gesture; capturing 120 a depth-image of the input device 20; determining 130, from the depth-image, the position of the input device 20; calculating 150, from the determined position, the distance of the first input device 20 from a predetermined location; and determining 160 a user command based on the detected gesture and the calculated distance.

The method can also comprise, before the step 150 of calculating the distance of the first input device 20 from a predetermined location: capturing a depth-image of a surface; and determining, from the depth-image, the location of the surface. In some embodiments, the depth image of the surface and the depth image of the input device will be the same image. The predetermined location from which the distance of the input device 20 is calculated can then be the surface. Also, in this case, the calibration or registration step of locating the surface can be done for each captured image frame (assuming it is automatic). For a sequence of frames, such calibration and recalibration can include or be replaced by tracking of the position of the surface in the depth image. In other embodiments, the calibration step is carried out in advance, using a separate depth image from which the input device 20 is absent.

The user's hand is one simple and intuitive example of the input device 20. However, other user devices may also be used. For example, the user may hold a wand or other pointer in his/her hand. This could be colored distinctively or exhibit characteristic markers, to aid detection in the image. Equally, another body part could be used, such as an extended finger or the head. In each case, the position of the input device can be calculated from a depth image.

In the example described above and shown in FIG. 1, the display surface is within the field-of-view of the range camera 30. However, in other embodiments, the surface may not be in the field of view. For example, the range camera could be rigidly fixed to the surface—in this case, the location of the surface relative to the camera coordinates will be fixed and known, so there is no need for the surface to appear in the scene of the depth image. The same applies if the relative arrangement of a predetermined location can be determined automatically by other means.

Embodiments can emulate touch control of a display surface (or any other surface) without the need for conventional touch-sensitive technology. They can also create a richer interaction experience with conventional graphic user interfaces because both touch and hover interactions may be catered for.

Also, the use of a range camera eliminates the need for the user to wear, carry or hold active pointing means, with inbuilt sensor or transmitter technology. Instead, the user's own hand, finger or forearm can be used as the pointing means. This can make the control of operations more intuitive and accessible.

Embodiments provide an architecture and related computational infrastructure such that a location-based parameter may be provided by the user so as to specify a gesture in more detail. In the embodiment of FIG. 1, the apparatus comprises a depth camera for producing a depth-image. The depth camera is connected to a processor which is arranged to determine, using the depth image, the distance of the input device 20 from a predetermined location. The determined distance can then be used as a parameter for specifying a gesture in more detail.

A gesture may therefore be combined with a distance parameter to determine a command or action desired by the user. Such a gesture which is combined with a parameter is hereinafter referred to as a distance-based (DB) gesture since a single gesture may be used for multiple modes of operation, the chosen mode being dependent on the distance parameter. A parameter may specify, for example, a target file location, target software program or desired command.

The distance-based gesture concept specifies a general pattern of interaction where there is a gesture command part and there is distance-based parameter part of an interaction. For example, a distance-based (DB) gesture according to an embodiment may be represented as follows:

DB Gesture=Gesture Command+Distance Parameter.

Thus, a DB gesture as an interaction consists of a user action performed at a particular location. When the user performs the pointing gesture, the location of the input device (relative to a predetermined location) is used as an extra parameter to specify the pointing gesture in more detail. Such a DB gesture may therefore be represented as follows:

DB Gesture=Pointing Gesture+Distance Parameter.

Considering now a DB gesture in more detail, two categories of operation can be identified: (i) Distance Measured Relative to the System or Sensor; and (ii) Distance Measured Relative to a User's Body.

(i) Distance Measured Relative to the System or Sensor

Some of the interactions that can be enabled here include the following examples.

Gesture Semantics Based on Proximity.

The concept here is that the same gesture can have different interpretations when made at different distances from the system. For example, when a user makes a pointing gesture from far away, the system can treat it as a large searchlight type of cursor. As the user comes closer to the system, the cursor reduces in size and becomes like a mouse pointer. Another example would be that as the user performs the same gesture from different distances, it operates on different levels of a multi-layered user interface.

Implementation: The action mapped to the same gesture (e.g. UI action) is varied based on the distance of the user from the system.

Control Assignment Based on Proximity

In a multi-user scenario, users closer to the system may be assigned more controls than users who are farther away. An exemplary scenario is a presentation where a person from the audience makes a gesture to skip to the next slide, versus the same gesture being made by the presenter. By only enabling the closest user to the presentation (i.e. the presenter) to perform a slide skipping action, the slide will only be skipped when the presenter makes the gesture. When someone in the audience makes the same gesture, the system could choose to ignore it, or treat it a request and seek confirmation from the presenter. The system could also aggregate audience requests and take appropriate action (e.g. skip the slide only more than 50% of the audience makes the gesture). On the other hand, the system may allow any one in the audience to point at an object of interest in the presentation.

In a variation, the assignment of control may be based on the relative distance of the users from the system, rather than the absolute distance.

These interactions are intuitive as most often presenters stand closer to the system whereas the audience is farther away.

Implementation: The gesture vocabulary may be designed such that the gestures allowed from a greater distance are a strict subset of, or different from, gestures from up close. Multiple such "tiers" may be defined. Alternatively, the gestures are the same, but the mapped action is different in the level of control or access implied (e.g. command vs. request).

Degree (Extent) of Command Based on Proximity

The degree or extent of impact resulting from a gesture (especially for manipulative gestures) may be varied based on the distance of the input device or user from the system. For example, a zoom-in gesture made from up close may result in a smaller amount of scaling that the same gesture made from a distance. Similarly for pointing gestures, the same movement of the pointing hand may translate to the larger cursor movement on the screen, if the user is farther away.

Implementation: The parameters of the mapped action such as "zoom-in image" or "move cursor" may be scaled or varied in proportion to the distance.

Type or Vocabulary of Gestures Based on Distance

The type of gesture supported may be made a function of distance. A specific instance of this is to vary the grossness of gestures made from different distances. The intuition here is that in human-to-human communication, people make gross gestures when gesturing from afar, and finer gestures when closer, to mean the same thing (e.g. moving the hand, versus the entire arm to wave goodbye). This can be used as follows. When a person walks towards the system, the kind of gestures he can produce become increasingly more granular and refined. For example, when the person is near the system, he could use small wrist-motion gestures to control a system and when far away, the person could use arm motion gestures for the same controls.

Implementation: The recognition system can automatically tune the vocabulary of gestures based on the distance and only allow the specific gesture set to be recognized. This tuning also reduces the processing load on the gesture recognition system as the search space is reduced.

The above ideas are clearly extensible to the multi-user situation wherein the distance of each user is known independently.

(ii) Distance Measured Relative to a User's Body

Figure 4:
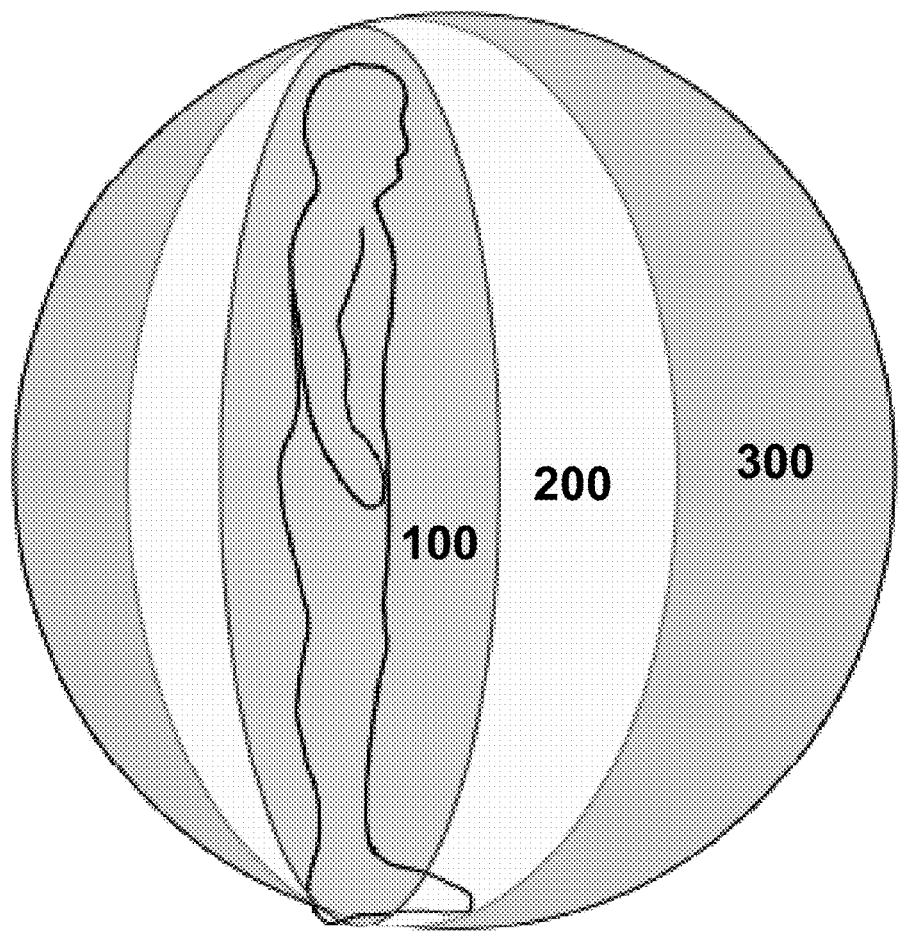
FIG. 4 show an example of zones being provided around a user's body according to an embodiment.

Some hand gestures could also be treated differently when made at different distances from the user's body. This can be used for example by creating virtual zones 100,200,300 around the user's body, as shown in FIG. 4.

Figure 5A:
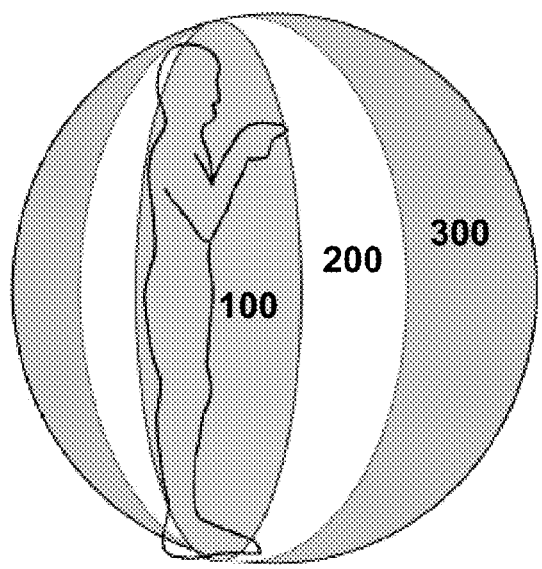
FIGS. 5a-5c show a user making a pointing gesture in the various zones of FIG. 4.
Figure 5B:
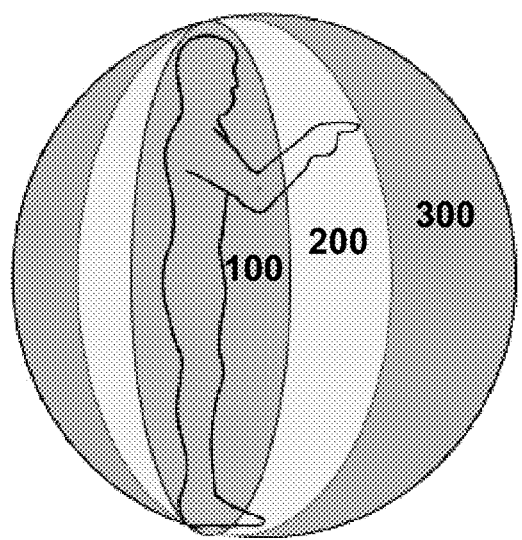
Figure 5C:
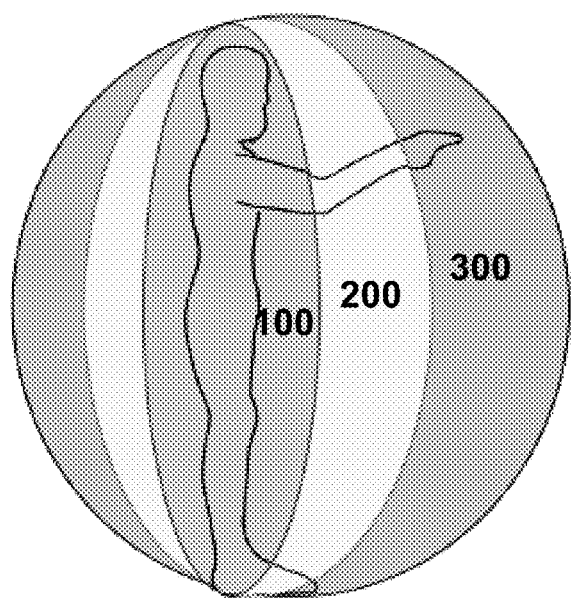

The gesture, together with the zone that it was made in, can be mapped to an appropriate action. For example, as shown in FIG. 5a, when the user makes a pointing gesture very close to his/her body (i.e. within zone 100), the system will treat it as a large searchlight type of cursor. As the user stretches out his hand (as shown in FIG. 5b), and enters the next zone, zone 200, the cursor reduces in size and becomes like a mouse pointer. As the user extends his arm further (as shown in FIG. 5c), and it enters the zone, zone 300, furthest from his/her body, the system treats that as a mouse press.

It should be understood that the kinds of interactions defined earlier in the context of distance of the user from the system, can also be developed with respect to the distance from the body. In fact, it is also possible to imagine that in the most general case, various distances such as that of the user from the system, from other users, and the distance of the hand gesture from the body can be used together to determine the gesture vocabulary and/or interpretation.

Gesture Determination

Gestures may be performed in the natural mode without necessarily requiring the user to enter any special modes— although a mode requirement may used in alternative embodiments, for example, requiring the user to hold a button while performing a gesture. The occurrence of a gesture may be determined based on a profile of the physical or logical x and y co-ordinates charted against time.

A gesture may also be determined based upon timing information. Because a gesture of a human may be a quick gesture, one or more predefined thresholds can be chosen. A movement threshold may be, for example, greater than 1 cm and the time threshold greater than 0.2 milliseconds and less than 700 milliseconds. These values of course may be varied to accommodate all users. In some embodiments a threshold may be defined based upon the size of a screen and/or the distance of the graphical element from an edge of the screen.

In other embodiments, a velocity threshold may be used instead of or in addition to a speed threshold, wherein the velocity threshold defines a minimum velocity at which the user must move his/her finger or hand for it to qualify as a gesture.

Other aspects of a gesture may be compared against other thresholds. For instance, the system may calculate velocity, acceleration, curvature, lift, and the like and use these derived values or sets of values to determine if a user has performed a gesture.

While specific embodiments have been described herein for purposes of illustration, various other modifications will be apparent to a person skilled in the art and may be made without departing from the scope of the concepts disclosed.

For example, an embodiment may comprise a computing device having a processing unit, input device location detection means and data storage means (not visible). The data storage means stores one or more software programs for controlling the operation of the computing device. The software program includes routines for enabling multimodal gestures to be used wherein a physical gesture (such as a flick) imparted by the user upon can be disambiguated or further defined by a distance-related parameter. These routines may be implemented in hardware and/or software and may be implemented in a variety of ways. In general, the routines are configured to determine when a user provides a gesture and to determine a distance of a user input device from a predetermined location.

The invention claimed is:

1. A method of processing a gesture performed by a user of an input device, the method comprising:
   detecting the gesture;
   determining a distance of the input device from a predetermined location, the detected distance being for disambiguating the gesture; and
   determining a user command based on the detected gesture and the determined distance.

2. The method of claim 1, wherein the step of detecting the gesture comprises:
   detecting movement or shape of the input device;
   comparing the detected movement or shape with a predetermined threshold value; and
   determining a gesture has occurred if the detected movement or shape is equal to or exceeds the predetermined threshold value.

3. The method of claim 2, wherein the predetermined threshold value is at least one of: a value of speed; a velocity value; a duration of time; a measure of straightness; a coordinate direction; a description of a shape and acceleration value.

4. The method of claim 1, when the distance is determined using a range camera.

5. The method of claim 4, wherein the step of detecting a distance of the input device from a predetermined location comprises generating a depth image and processing the depth image in accordance with a depth recognition process.

6. The method of claim 1, wherein the input device comprises a mouse, a stylus or the user's finger.

7. A system for processing a gesture performed by a user of a first input device, the system comprising:
   detection means adapted to detect the gesture;
   distance determination means adapted to determine a distance of the input device from a predetermined location, the detected distance being for disambiguating the gesture; and
   a processing unit adapted to determine a user command based on the detected gesture and the determined distance.

8. The system of claim 7, wherein the detection means comprises:
   input device detection means adapted to detect movement or shape of the input device;
   a comparison unit adapted to compare the detected movement or shape with a predetermined threshold value; and
   a gesture determination unit adapted to determine a gesture has occurred if the detected movement or shape is equal to or exceeds the predetermined threshold value.

9. The system of claim 8, wherein the predetermined threshold value is at least one of: a value of speed; a velocity value; a duration of time; a measure of straightness; a coordinate direction; and acceleration value.

10. The system of claim 7, when distance determination means comprise a range camera.

11. The system of claim 10, wherein the range camera is adapted to generating a depth image and wherein the distance determination means are adapted to process the depth image in accordance with a depth recognition process so as to determine the distance of the input device from a predetermined location.

12. The system of claim 7, wherein the input device comprises a mouse, a stylus or the user's finger.

13. The system of claim 7, wherein the gesture is a flick gesture.

14. A computer program on a non-transitory computer readable medium, comprising computer program code to perform the method of claim 1, when said program is run on a computer, the method of processing a gesture performed by a user of an input device comprising:
   detecting the gesture;
   determining a distance of the input device from a predetermined location, the detected distance being for disambiguating the gesture; and
   determining what user command corresponds to the gesture based on both the detected gesture and the determined distance, wherein a particular gesture made at different determined distances corresponds to different user commands depending on the determined distance.

15. A system for processing a gesture performed by a user of a first input device, the system comprising:
a camera to detect the gesture;
a sensor to determine a distance of the input device from a predetermined location, the detected distance being for disambiguating the gesture; and
a processing unit to determine a user command based on both the detected gesture and the determined distance, wherein a same gesture made at different distances may indicated different user commands depending on the determined distance.

16. The system of claim 15, wherein:
when the determined distance is less than a threshold distance, a pointing gesture indicates a selection command; and
when the determined distance is greater than said threshold distance, said pointing gesture indicates a hover command for indicating movement of a cursor.

17. The system of claim 15, wherein said camera and sensor are combined in a range camera.

18. The system of claim 15, further comprising a multi-layered user interface, wherein said gesture is paired with and enters a user command to a particular layer of said multi-layered user interface depending on said determined distance, wherein different ranges of determined distance correspond to different layers of said multi-layered user interface.

19. The system of claim 15, wherein different sets of user commands based on corresponding gestures are available at different determined distances from said predetermined location.

20. The system of claim 15, wherein said sensor is to determine a second distance between a user's body and the input device performing the gesture, wherein a user command resulting from the gesture depends on all of the detected gesture, the determined distance between the input device and the predetermined location, and the determined second distance between the user's body and the input device.

* * * * *